United States Patent
Dronamraju et al.

(10) Patent No.: US 8,429,081 B1
(45) Date of Patent: Apr. 23, 2013

(54) TECHNIQUES FOR SECURELY DELIVERING MEDIA DATA

(75) Inventors: Ravikanth Dronamraju, San Jose, CA (US); Jamshid Mahdavi, San Jose, CA (US)

(73) Assignee: Novell, Inc., Provo, UT (US)

( * ) Notice: Subject to any disclaimer, the term of this patent is extended or adjusted under 35 U.S.C. 154(b) by 1848 days.

(21) Appl. No.: 10/777,956

(22) Filed: Feb. 12, 2004

(51) Int. Cl.
*G06F 21/00* (2006.01)

(52) U.S. Cl.
USPC ............ 705/59; 705/50; 705/51; 705/901; 705/902; 705/904; 705/911; 380/201; 380/202; 380/203; 380/204

(58) Field of Classification Search .............. 705/59
See application file for complete search history.

(56) References Cited

U.S. PATENT DOCUMENTS

| | | | |
|---|---|---|---|
| 5,165,030 A | 11/1992 | Barker | 703/20 |
| 5,719,786 A | 2/1998 | Nelson et al. | 364/514 A |
| 5,892,900 A * | 4/1999 | Ginter et al. | 726/26 |
| 6,286,103 B1 | 9/2001 | Maillard et al. | 713/200 |
| 6,449,719 B1 | 9/2002 | Baker | 713/168 |
| 7,231,516 B1 * | 6/2007 | Sparrell et al. | 713/156 |
| 2002/0136405 A1 * | 9/2002 | Hori | 380/203 |

FOREIGN PATENT DOCUMENTS

JP 2003101524 A * 4/2003

OTHER PUBLICATIONS

Wikipedia (http://en.wikipedia.org/wiki/Trusted_Computing). Retrieved Dec. 31, 2012.*

* cited by examiner

*Primary Examiner* — James A Reagan
(74) *Attorney, Agent, or Firm* — Schwegman, Lundberg & Woessner, P.A.

(57) ABSTRACT

Techniques are provided for securely delivering media data. A requestor is directed to a secure streaming portal after being authenticated. A requesting application contacts the secure streaming portal and requests media data. A configuration header having a key for decrypting the media data is sent to the requesting application using secure communications. The media data is dynamically encrypted using the key and streamed to the requesting application. The requesting application uses the key and decrypts the encrypted media data for consumption.

5 Claims, 4 Drawing Sheets

TECHNIQUES FOR SECURELY DELIVERING MEDIA DATA

FIELD OF THE INVENTION

The invention relates generally to network security, and more specifically to techniques for securely delivering media data.

BACKGROUND OF THE INVENTION

Protecting intellectual property rights associated with media data (e.g., audio, video, video conferencing, Internet Telephony, etc.) is a paramount concern for content providers in today's highly connected Internet and World-Wide Web (WWW) environments. Some content providers may license their media data content (e.g., movies, music, etc.), such that secure distribution becomes critical to their revenue base. Other content providers do not sell their media data (e.g., video conferencing, Internet Telephony, etc.) but need to ensure that their media data remains confidential, is not maliciously intercepted, and is consumed only by intended recipients.

In many cases, a content provider's media data resides internal within an enterprise's firewall environment, such as an Intranet, but there is a need and a desire for distributing that media data to external recipients securely. In other cases, the media data is only accessible via hardwired or other dedicated secure communication lines or only accessible via dedicated Virtual Private Networks (VPNs). These solutions are expensive and restrictive to content providers because consumers of the media data need expensive and limiting environments for acquiring the media data and for ensuring proper delivery and consumption.

Moreover, media players that are conventionally available in the industry for playing or consuming media data are not equipped for handling communications using secure communications protocols, such as Hyper Text Transfer Protocol (HTTPS) over a Secure Socket Layer (SSL), referred to as HTTPS. Thus, if content providers desire to stream their media data in a secure fashion, they are out of luck because media players designed to processing streaming media data cannot communicate with HTTPS. Furthermore, streaming is often a necessity because of the voluminous nature of typical media data. Without a streaming solution, media players would experience long initial latency before play can be initiated, and play may be continuously delayed or interrupted while waiting on more of the media data to arrive at the media player. Thus, streaming solutions have become a real necessity in the industry because of usability issues and timeliness issues.

Another technique which content providers use is deploying a Digital Rights Management (DRM) system. A DRM is maintained and manually configured by network administrators associated with the content provider. A DRM will encrypt media data based on a specific instance of that media data for consumption and delivery to users. That encrypted data is then decrypted and used by the media players of the users over insecure communication channels (e.g., existing streaming protocols, such as Real Time Protocol (RTP), Real Time Streaming Protocol (RTSP), and Multimedia Messaging Service (MMS) over HTTP, etc.) The problem with DRM is that each instance of media data needs to be manually defined and maintained by the network administrators, which is a time-consuming and resource-expensive task. Additionally, the DRM needs to be manually installed and interfaced to the streaming service associated with the content provider. As a result, many content providers have shied away from conventional DRM systems.

Correspondingly, many content providers continue to deliver their media data using traditional and insecure communications, such as HTTP. This media data is encoded in industry standard formats, which any malicious intruder can decode simply by having a conventional media player. Alternatively, content providers continue to deliver their media data using expensive and limiting solutions, such as dedicated secure communication channels hardwired or existing as dedicated VPNs. Still other content providers have resigned themselves to the fact that a DRM system and its associated manually-intensive support is a necessity for them. The present situation is not preferred and not desired, but a reality that content providers are forced to deal with. Either a content provider limits accessibility to its media data to a select few who can afford to acquire the necessary hardware or VPN, a content provider elects to enhance its user base and knowingly exposes its media data to malicious interception and potential near instantaneous world-wide exposure or a content provider installs a manually-intensive DRM system.

Thus, there is a need for improving the techniques associated with securely delivering media data.

SUMMARY OF THE INVENTION

In various embodiments of the invention, techniques are presented for securely delivering media data. The media data resides in an external environment to a requestor. A requestor makes an initial request for the media data via secure communications. The requestor is authenticated and a requesting application associated with the requestor is directed to a secure streaming portal for acquiring the media data. A configuration header is transmitted to the requesting application using secure communications. The configuration header includes or refers to a key which the requesting application uses to decrypt an encrypted version of the media data when it is received. The key is also used to dynamically encrypt the media data before it is streamed to the requesting application. The encrypted media data is streamed to the requesting for consumption.

DETAILED DESCRIPTION OF THE INVENTION

In various embodiment of the invention, the term "service" is used. A service is one or more applications, systems, portals, or combinations of the same that perform some processing on behalf of a requestor or requesting application. The term "portal" is used in a broad and generic sense and refers to a gateway, proxy, hub, bridge, switch, router, or server that includes one or more services on it for performing some operations on behalf of a requestor or a requesting application. Thus, in some instances, a portal can be logically viewed as a single service. Generally, a portal serves as a gateway to accessing external services over the WWW, Internet, or other types of networks. A requestor is an interface application being used by another application or an end-user. In one embodiment the interface application is a WWW browser that an end-user interacts with for purposes of acquiring media data. A requesting application is one that is automatically initiated based on some actions of the requestor or manually initiated by the requestor. In one embodiment, the requesting application is a media player. That media player can be any conventionally available media player or can be a custom-developed media player.

Media data can be any video data, audio data, or combinations there of. In some embodiments the media data is a movie, a movie clip, a movie trailer, a music snippet, a song, or a music album. In other embodiments, the media data is audio and video associated with teleconferencing. In more embodiments, the media data is audio and video associated with electronic learning, which also includes presentation materials, such as notes or slides. In still other embodiments, the media data is voice communications over the Internet, such as IP Telephony. In yet more embodiments, the media data can be an electronic game being distributed over a network.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platforms, operating systems, proxy services, or browser/client applications. Any particular architectural layout or implementation presented herein is provided for purposes of illustration and comprehension only and is not intended to limit the various aspects of the invention.

Figure 1:
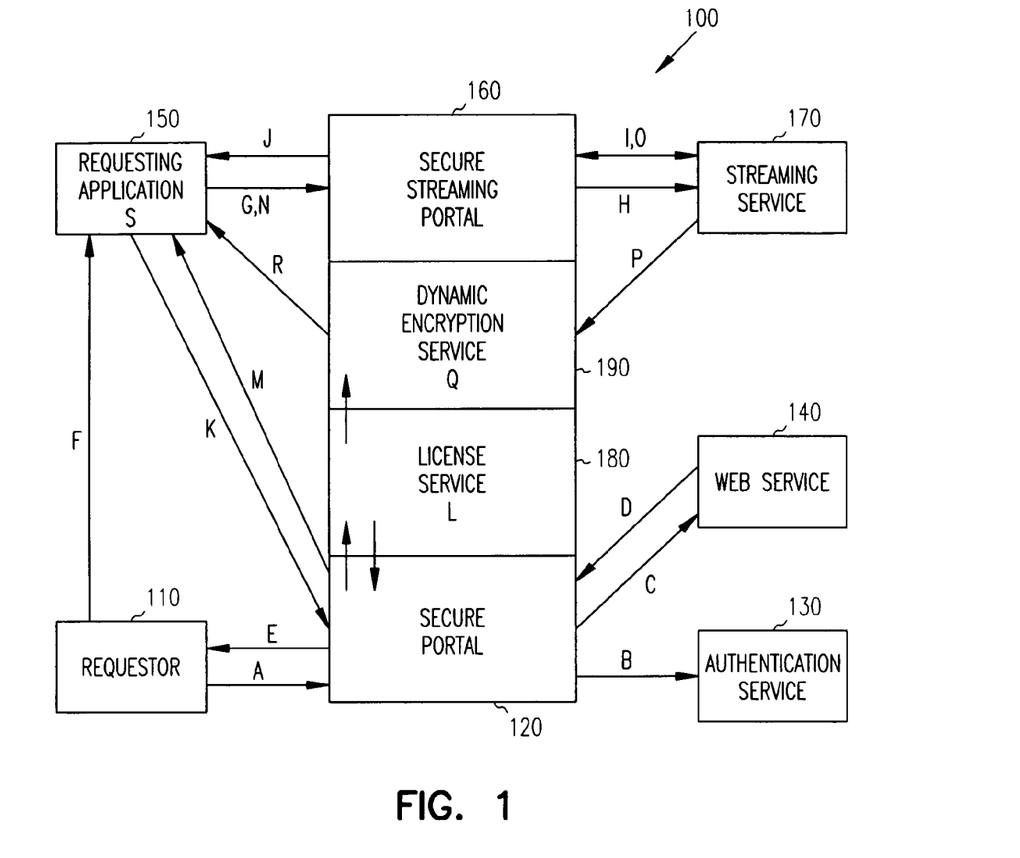
FIG. 1 is a diagram of an architecture layout and example interactions for securely delivering media data.

FIG. 1 is a diagram representing an example architecture layout 100 which depicts interactions occurring between various architectural entities for securely delivering media data. The architecture 100 is implemented as one or more applications, service, and portals which reside in a computer-accessible medium and are accessible over a network. The architectural entities and arrangement is presented for purposes of illustration only, since it is readily apparent that in some embodiments the entities can be re-arranged, entities can be removed, and some entities can be logically combined to perform the teachings presented herein and below. Thus, the architecture 100 presented in FIG. 1 is not intended to limit embodiments associated with this invention.

The example architecture 100 of FIG. 1 includes the following entities: a requestor 110, a secure portal 120, an authentication service 130, a WWW service 140, a requesting application 150, a secure streaming protocol 160, a streaming service 170, a license service 180, and a dynamic encryption service 190. The arrows of FIG. 1 are labeled A-S and are used for purposes of illustration in describing how the architectural entities interact with one another. The example illustration that follows is just one scenario of many scenarios which can be realized with the entities and architecture 100 of FIG. 1. The architecture 100 permits a requestor 110 via its requesting application 150 to securely acquire media data from a streaming service 170 over a network, such as the Internet or WWW.

As an example illustration of one processing scenario for FIG. 1, consider an end-user that is interacting with a WWW browser (requestor 110) over an Internet connection provided by an Internet Service Provider (ISP). Before the requestor 110 can acquire desired media data, the requestor 110 contacts a secure portal 120 via A for purposes of authenticating the end-user's identity to the architecture 100. In one embodiment, this interaction depicted as A in FIG. 1 occurs using HTTPS communications. The initial request made in A may actually be a request for the desired media data, but the architecture intercepts this request and determines if requestor 110 (e.g., end-user interacting with the requestor) is authenticated already or needs to be authenticated before the request can be satisfied.

Assuming that the requestor 110 has not and is not currently authenticated, the secure portal 120 performs the authentication or requests authentication of the requestor 110 via B from an external authentication service 130. After authentication is confirmed, the secure portal 120 uses C to initially make the request for the media data on behalf of the requestor 110 from a WWW service 140 which controls the media data or has access to the media data. The WWW service 140 responds with D with a browser page or link which can be used to access the media data. In response to D, the secure portal 120 rewrites the browser page or link in the browser page to direct the requestor 110 to the secure streaming portal 160. The rewritten browser page or link may include a unique token which can be used to identify the requestor at a later point in time. The rewritten browser page or link is then communicated to the requestor 110 as E.

At this point the requestor 110 has information to initiate a requesting application 150 via F for purposes of acquiring the streaming media data and playing the same for the requestor 110. In one embodiment, the requesting application is a media player. The media player can be initiated automatically by the requestor 110 upon the receipt of E, it can be embedded in the browser page received in E, or it can be manually started by the end-user interacting with the requestor from a link embedded in the browser page received in E.

Once initiated, the requesting application 110 requests via G a configuration header for the desired media data. The secure streaming portal 160 will satisfy this request by using H to request the configuration header from a streaming service 170. In response to the request made from the secure streaming portal 160, the streaming service 170 provides the configuration header via I. Next, the secure streaming portal rewrites the configuration header to require a license and specifies the location of the license service 180. This location of the license service 180 is identified as a link requiring secure communications, such as HTTPS. Interaction between the requesting application 150 and the secure streaming portal 160 does not use secure communications (e.g., uses conventional HTTP, File Transfer Protocol (FTP), a streaming control protocol such as RTSP, etc.). The modified configuration header and the license link are sent from the secure streaming portal 160 to the requesting application 150 via J.

The requesting application 150 is not designed to receive streaming media data via secure communications, such as HTTPS, but is capable of handling non media data transactions via secure communications (e.g., HTTPS). In some embodiments, the requestor 110 actually handles non media data transactions occurring via secure communications on behalf of the requesting application 150. When the requesting application 150 receives the configuration header and link to the license service 180 via J, a request for a license is made via secure communications with K to the secure portal 120, which the secure streaming portal 160 included as the address for the licensing service 180. Optionally, at this point the secure portal 120 can authenticate the requesting application 150 in addition to the existing authentication which was performed on the requestor 110 (e.g., end-user). This can provides additional security to the architecture 100.

The secure portal 120 contacts the license service 180 to request a license on behalf of the requesting application 150. The secure portal 120 and the licensing service 180 are in an authenticated and trusted relationship with one another and use secure their communications with one another by using local communications or a secure protocol such as HTTPS. Therefore, in response to the request for a license, the license service 180 with L obtains a license for the requesting application 150. The license includes among other things a encryption key and a decryption key uniquely associated with the specific requesting application 150 and the specific media data being requested. Moreover, the license key may include licensing or use restrictions associated with a license, which defines the relationship between the unique requesting application 150 and the specific media data being requested for consumption. The license key having the encryption key is passed securely (e.g., via HTTPS) to a dynamic encryption service 190. Concurrently, or subsequently, the license service (via the secure portal 120) securely transmits the license key having the decryption key to the requesting application 150 via M.

Now the requesting application is in a position or a configuration state to properly request and play the desired streaming media data. Accordingly, the requesting application 150 with N makes a request to the secure streaming portal 160 for the desired media data. The secure streaming portal 160 passes this request along to the streaming service 170 via O. The secure streaming portal 160 has direct access and control over delivering the desired media data using streaming techniques and protocols, such as RTP, MMS, RTSP, etc. The streaming service 170 satisfies this request for the desired media data by beginning to stream the desired media data to the dynamic encryption service 190 via P.

The dynamic encryption service 190 receives the streamed media data and dynamically encrypts the media data with Q using the encryption key associated with the previously acquired license key received from the license service 180. As the media data is dynamically encrypted, the encrypted version of the media data is streamed to the requesting application via R. In some embodiments, portions of the encrypted media data are cached by the dynamic encryption service 190 for more efficient delivery and accesses being requested by the requesting application 150.

The requesting application 150 receives the streamed and encrypted media data via R using conventional insecure communication protocols, such as MMS, RTP, RTSP, etc. In response to receiving the encrypted media data, the requesting application with S uses its decryption key associated with the previously acquired license key to begin to dynamically decrypt, buffer, and play the decrypted version of the media data.

The embodiments of the architecture 100 and the present example interactions demonstrate how media data can be more securely delivered using a combination of secure communications and necessary insecure communications which are needed by media players to consume media data. The entities interposed between the requestor 110 and the requesting application 150 enforce security and provide techniques for implementing customized encryption techniques based on the identities of the parties, specific media data being requested, and license that define and restrict these relationships.

Figure 2:
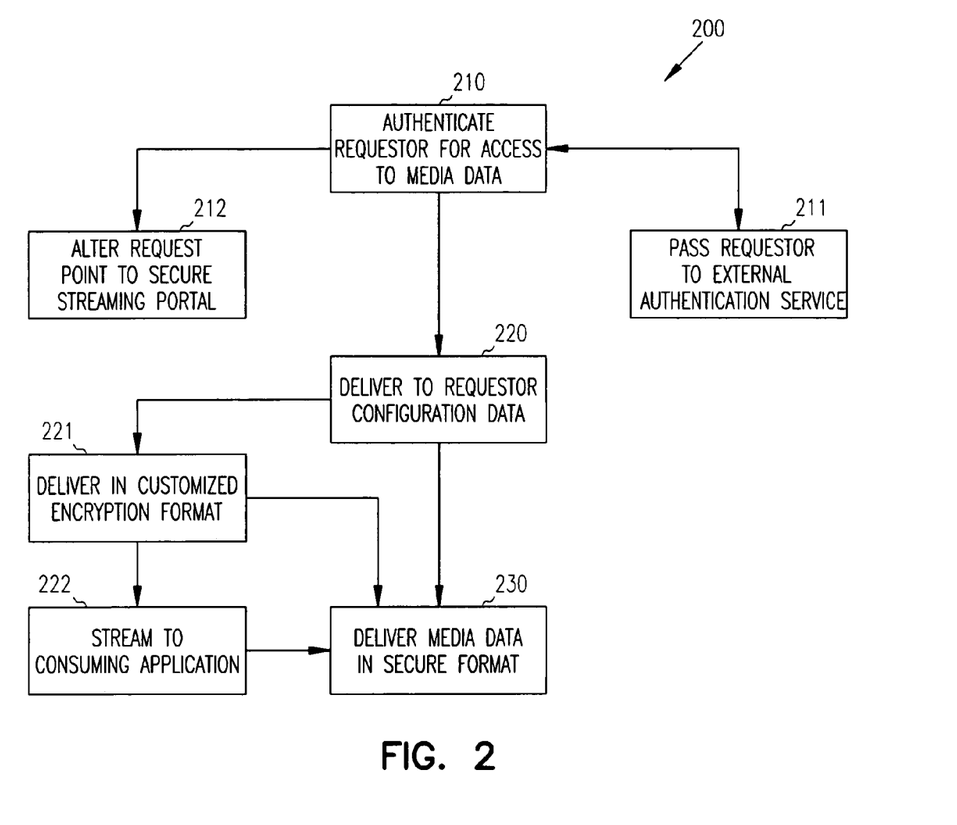
FIG. 2 is a flowchart representing a method for securely delivering media data.

FIG. 2 is a flowchart of one method 200 for securely delivering media data. The method 200 (hereinafter "processing") is implemented in a computer readable medium and accessible over a network. In one embodiment, the processing represents the combined processing of the secure portal 120, the secure streaming portal 160, the license service 180, and the dynamic decryption service 190 depicted and described above in architecture 100 of FIG. 1.

Initially, at 210, a requestor is authenticated for secure access to requested media data. In some embodiments, the requestor is a WWW browser application that is interacting with an end-user. In other embodiments, the requestor is an automated application designed to periodically request media data or to automatically acquire media data upon the detection of some predefined event. Moreover, authentication at 210 need not require any affirmative or authentication processing when the processing can satisfy itself that the requestor is already an existing authenticated requestor. In cases, where the requestor is not already authenticated to the processing the processing can use a backend or external authentication service or mechanism at 211 to properly authenticate the requestor. Non authenticated requestor may not proceed with the processing depicted in FIG. 2 (not shown in FIG. 2).

Once the processing is satisfied that the requestor is authenticated, the processing can, in one embodiment, at 212, alter the initial received request for the media data to point to a secure streaming portal, such as secure streaming portal 160 of FIG. 1. The processing may also contact a WWW service, such as the WWW service 140 of FIG. 1, in order to determine where and how the media data is to be acquired for purposes of satisfying the requestor's specific media data request. That information is masked from the requestor and altered, such that the requestor is not capable of determining its true origin. While the processing satisfies itself as to the true identity of the requestor and delivers the modified information about how to acquire the desired media data communications between the processing and the requestor occur securely (e.g., with HTTPS, etc.).

At 220, the processing delivers a configuration header for the media data to the requestor. In some cases, this delivery occurs directly to a requesting application associated with the requestor which will acquire and consume the media data. Thus, delivery of the configuration header need not be directly made to the requestor and in fact in many cases delivery occurs indirectly to the requestor via its requesting application.

The configuration header can include a variety of information which is needed by the requesting application of the requestor to properly and securely consume the desired media data. For example, the configuration header is similar to conventional media data content headers in that it includes information regarding a media data's length, play configuration settings, play limitations, authoring information, content provider information, any licensing information, etc. However, the configuration header is unique over conventional content headers in that it is also associated with a licensing key that includes a unique decryption key which is needed by the requesting application to decrypt an encrypted media data stream for play.

The processing at 220 is not a single delivery of the entire configuration header; rather, portions of the delivery at 220 occur via insecure communications and portions occur via secure communications. That is, the conventional portion of the configuration header is delivered to the requesting application via insecure communications, and the portion of the configuration header that includes the license key having the decryption key are delivered to the requestor or the requesting application via secure communications, such as HTTPS. In one embodiment, as was discussed above with respect to the architecture 100 of FIG. 1, the licensing key and decryption key are actually requested by the requesting application before complete delivery 220 of a configuration header occurs. In one embodiment, this request is indirectly made to a license service 180 through a secure portal 120.

Thus, although the configuration header is being presented as a single piece of metadata, it is actually two distinct pieces of metadata that is logically associated as single piece of metadata for purposes of embodiments of the invention. Moreover, the complete delivery of that configuration header can occur as a result of a variety of interactions, such as what was discussed above with respect to the architecture 100 of FIG. 1.

Moreover, prior to the satisfied delivery of 220 of a complete configuration header, the processing acquires the license key having, among other things, an encryption key, the decryption key, and licensing restrictions associated with a license. The license defines the limitations on the relationship between the requestor (requesting application) and the specific desired media data. In one embodiment, the processing securely (e.g., HTTPS) requests the license key from a license service 180.

The encryption key is used for uniquely encrypting any acquired media data in a format that can be decrypted by the corresponding decryption key. In this manner, the desired media data is not usable without the configuration header and its associated decryption key. In one embodiment, the encryption key is securely (e.g., HTTPS) passed to a dynamic encryption service 190 prior to or concurrently with the delivery of the configuration header at 220. The dynamic encryption service 190 uses the encryption key for purposes of dynamically encrypting the desired media data in a customized encryption format at 221. The dynamic encryption service 190 also streams the encrypted media data to the requesting or consuming application at 222. The original media data stream is streamed from an origin streaming service, such as streaming service 170 of FIG. 1.

Once the requesting application has the decryption key, the encryption key is obtained, and at least some portions of the desired media data encrypted with the encryption key, the encrypted media data is delivered to the requesting application at 230 in a secure format. The secure format is the customized encryption format associated with the license key, which is logically a part of or associated with the configuration header. Delivery at 221, 222, and 230 occurs with insecure communications using conventionally available streaming protocols (e.g., MMS, RTP, RTSP, etc.). However, any later developed or custom-developed streaming protocol can also be used at 221, 222, and/or 230. Accordingly, the teachings presented herein are not intended to be restricted to any particular existing or later developed streaming protocol.

The requesting application consumes the streamed media data received in the secure format by using its decryption key to dynamically decrypt, buffer, and play the decrypted version of the media data. Security of the delivery of the media data has been ensured by using secure communications when it was appropriate to do so and by using custom encryption which is defined by a specific license associated with the relationship between the requesting application (requestor) and the specific desired media data.

Figure 3:
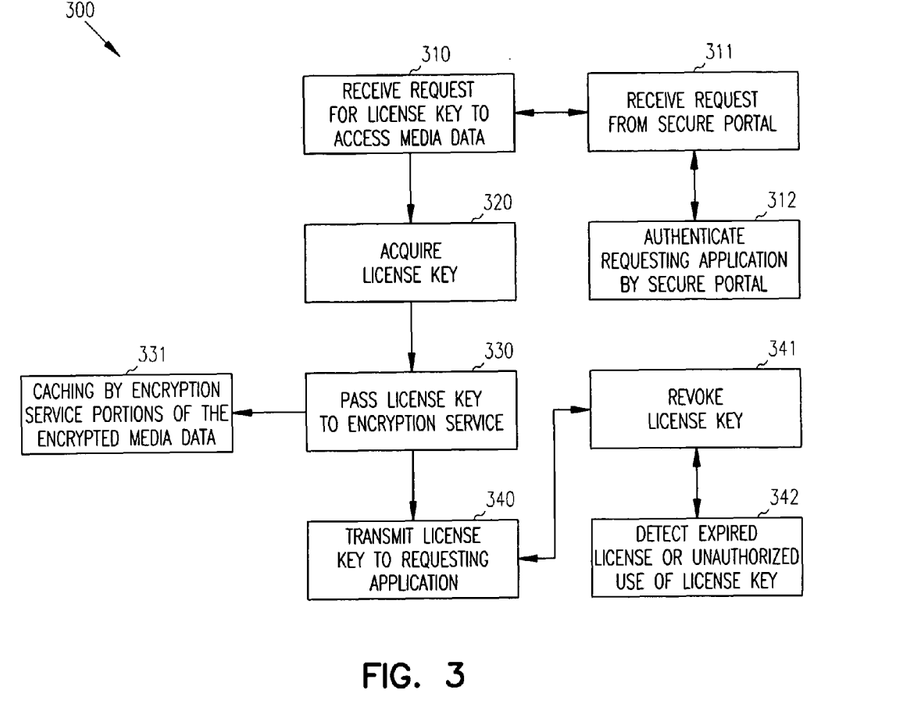
FIG. 3 is a flowchart representing another method for securely delivering media data.

FIG. 3 is a flowchart of another method 300 for securely delivering media data. The method 300 is implemented in a computer readable medium and accessible over any network or combinations of networks interfaced to one another. The processing of the method 300 is implemented as a license service, similar to the licensing service 180 of the architecture 100 presented with FIG. 1.

Initially, the license service is in a trusted and authenticated relationship with a number of other services, such as the secure portal 120 and the dynamic encryption service 190 depicted with the architecture 100 of FIG. 1. Communications coming into the license service and going out of the license service are done securely (e.g. with HTTPS, etc.).

At 310, the licensing service receives a request for a license key to access media data. Again, this request is received securely, and, in one embodiment, at 311, is received from a secure portal 120 acting as an intermediary between the license service and a requesting application. In one embodiment, at 312, the secure portal 120 performs authentication on the requesting application or ensures itself that the requesting application is who it purports to be. Thus, when the license service receives the request it can rely on the fact that the request for the license key is a valid and authenticated request.

At 320, the license service inspects the request to identify the requesting application, optionally the identity of a requestor associated with the requesting application, and the specific media data desired by the request. This information permits the license service to access a license data store or contact an external service to acquire a license key. The license key includes a decryption key and an encryption key. In some embodiments, the license key also includes licensing restrictions which define how media data acquired with the key can be used and/or which define conditions or events which when detected can revoke the license key.

At 330, the license service passes the license key having at least the encryption key included therein to a trusted dynamic encryption service, such as dynamic encryption service 190 of the architecture 100 depicted in FIG. 1. The dynamic encryption service uses the encryption key to dynamically encrypt the desired media data which is streamed to the dynamic encryption service by a streaming service, such as the streaming service 170 of the architecture 100 depicted in FIG. 1. The dynamic encryption service will also stream the encrypted media data to the requesting application when it is appropriate to do so. In some embodiments, at 331, portions of the encrypted media data can be locally cached by the dynamic encryption service for purposes of better delivering and servicing the requesting application. The dynamic encryption service streams the encrypted portions of the media data to the requesting application via insecure streaming protocols (e.g., MMS, RTP, RTSP, etc.) or custom-developed streaming protocols.

Concurrent with the passing of the license key or after the passing of the license key at 330, the license service transmits the license key having at least the decryption key to the requesting application. This transmittal actually occurs indirectly with secure communications (e.g., HTTPS) through a secure portal, such as secure portal 120 of the architecture 100 depicted in FIG. 1.

In some embodiments, the license service may revoke an existing license key at 341. This can occur when another service or the license service itself becomes aware of an expired license key or detects an unauthorized attempted use of the desired media data which does not conform to a license associated with the license key, and which is identified by the license as an event that warrants revoking the license key. One technique for the license key to effectuate a revoked license key is to notify the dynamic encryption service of the revocation, since it is the dynamic encryption service that streams the encrypted media data to the requesting application. In this way, when the dynamic encryption service receives notice of a revoked license key it can immediately stop servicing requests to deliver encrypted versions of the desired media data. Moreover, since the license service and the dynamic encryption service are in a mutual trusted relationship, the license service can rely on the fact that the dynamic encryption service will honor its revocation and stop servicing the affected requesting application.

The license service of FIG. 3 demonstrates how an isolated and secure service can interact with other services and portals for purposes of ensuring secure delivery of media data, where the media data is actually delivered via insecure communications by one of those other services acting in conformance with the strictures dictated by the license service. Accordingly, conventional media players can consume the media data in a secure fashion although the communication channel that ultimately delivers the media data remains insecure.

Figure 4:
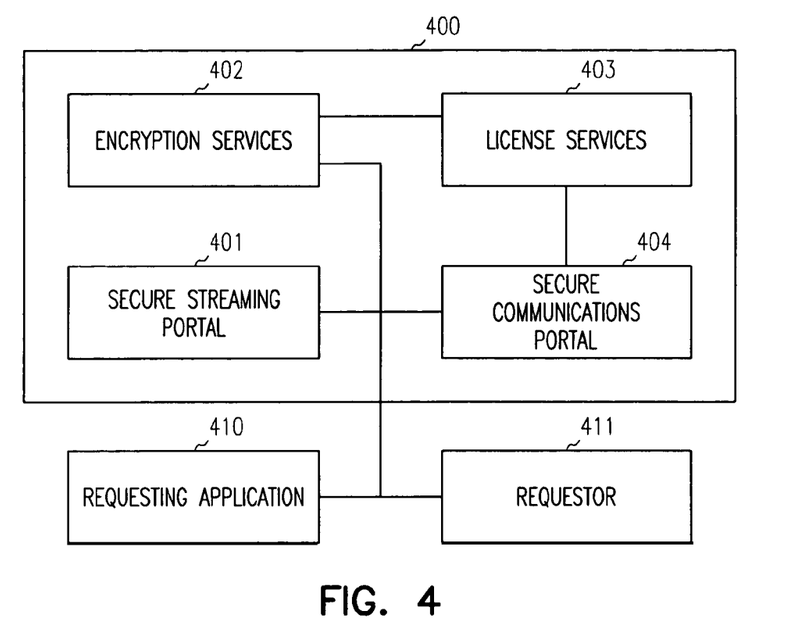
FIG. 4 is a diagram of a secure media data delivery system.

FIG. 4 is a diagram of one secure media data delivery system 400. The secure media data delivery system 400 resides in a computer readable medium and is accessible over any network or combinations of networks interfaced together. The secure media data delivery system 400 implements a number of the techniques presented above with respect to the architecture 100, the method 200, and the method 300, of FIGS. 1-3, respectively.

The secure media data delivery system 400 includes a secure streaming portal 401, an encryption service 402, a licensing service 403, and optionally a secure communications portal 404. The secure streaming portal 401 acts as an intermediary between a requesting application 410 and a streaming media service (not shown in FIG. 4). That is the secure streaming portal 401 receives requests for media data from the requesting application 410 and submits the same directly to the streaming service.

The initial request from the requesting application 410 is for the secure streaming portal 401 to acquire a configuration header needed for ultimately acquiring the desired media data. That configuration header includes another address for acquiring a license key. The address for that license key is the secure communications portal 404. The secure streaming portal 401 and the requesting application 410 interact with one another via insecure communications (e.g., HTTP). Conversely, interactions between the requesting application 410 and the secure communications portal 404 occur via secure communications (e.g., HTTPS, etc.).

The secure communications portal 404 receives a request via secure communications from the requesting application for acquiring a license key to associate and bind with the configuration header. In response to this, the secure communications portal 404 interacts securely and in a trusted manner with the license service 403. The license service 403 inspects the request for the license key and performs processing similar to what was discussed above with respect to the method 300 of FIG. 3. More specifically, the license service 403 identifies the specific identity of the requesting application 410, the requestor 411 associated with the requesting application 410, and the specific media data being requested. This information permits the license service 403 to acquire a license which is unique to the relationship of the requesting application 410, the requestor 411, and the specific media data being requested. The license key includes a decryption key and an encryption key along with licensing restrictions.

The license service 403 communicates securely with the encryption service 402 and the secure communications portal 404. The license key along with the needed encryption key is transmitted to the encryption service 402. The encryption service 402 uses the encryption key to dynamically encrypt media data received from a streaming service. In some embodiments, the encryption service 402 communicates the encrypted media data using insecure communications to the requesting application 410.

The license service 403 also communicates securely with the secure communications portal 404 to deliver the license key along with the needed decryption key. The secure communications portal 404 securely transmits the license key and the decryption key back to the requesting application 410. The decryption key is used by the requesting application 410 to dynamically decrypt the encrypted media data which is streamed from the encryption service 402 to the requesting application 410.

In one embodiment, the requesting application 410 is initially started either automatically or manually from the requestor 411. The requestor 411 initially wants to acquire the media data and authenticates to the secure communications portal 404 using secure communications (e.g., HTTPS). The secure communications portal 404 may use its own authentication mechanism or some other backend or external authentication service to ensure itself that the requestor 411 is authenticated. Next, the secure communications portal 404 contacts a WWW service to determine where and how the desired media data can be acquired for the requestor. This information is modified by the secure communications portal 404, such that it points to the secure streaming portal 401. Upon receiving the modified information, the requestor automatically or manually initiates the requesting application 410 and passes the address of the secure streaming portal 401. In one embodiment, the requesting application 410 is a media player, a media player embedded within a browser page, or a link which can be manually activated from within a browser page to initiate the media player. Once the requesting application 410 is initiated, the processing proceeds in the manners described herein and above.

In one embodiment, the secure streaming portal 401, the encryption service 402, the license service 403, and the optional secure communications portal 404 all reside within the same processing environment or local network. In other embodiments at least one or more of the entities reside in different processing environments or external networks.

The secure media data delivery system 400 permits a combination of secure and insecure communications to be combined with custom encryption to securely deliver media data to a requesting application 410 associated with a requestor 411. This offers an improvement over conventional techniques because it is easily integrated within a media delivery system and easily and automatically maintained. This is so, because of the unique and novel processing features associated with the secure streaming portal 401, the encryption service 402, and the license service 403.

Figure 5:
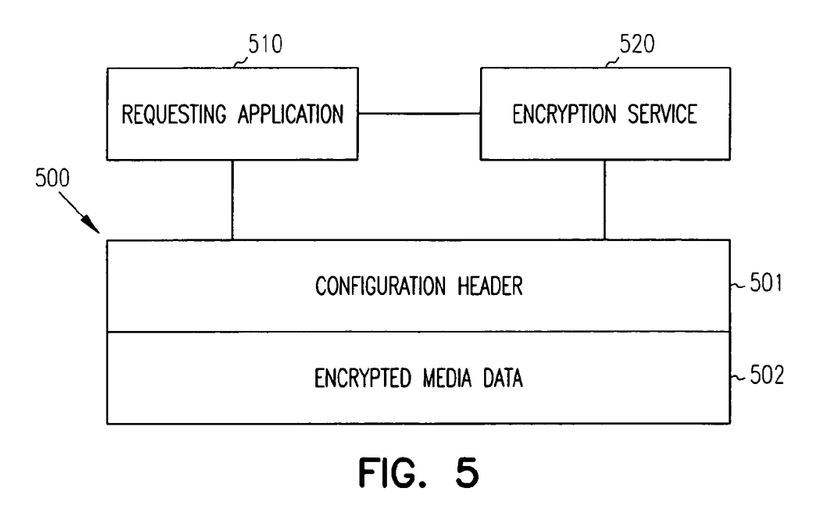
FIG. 5 is a diagram representing a secure media data structure.

FIG. 5 is a diagram of one secure media data structure 500. The media data structure 500 is implemented and accessible in a computer readable environment. Moreover, the media data structure need not be contiguously stored within memory or storage. That is, in many embodiments, the media data structure 500 is dynamically received in portions at different points in processing or at different times during a transaction and logically assembled or associated as a single media data structure 500. In one embodiment, the media data structure 500 is the data consumed by the requesting applications discussed herein and above with respect to the architecture 100, the method 200, the method 300, and the system 400, of FIGS. 1-4, respectively.

The secure media data structure 500 includes a configuration header 501 and encrypted media data 502. The configuration header 501 includes conventional content information associated with a decrypted version of the encrypted media data 502 and includes a decryption key associated with a license key. In some embodiments, this decryption key is acquired via a address pointer contained within the configuration header 501, which instructs a requesting application 510 that consumes the secure media data structure 500 to contact a secure communications portal for purposes of acquiring the decryption key and license key. The secure communications portal securely communicates with the requesting application 510 and a license service. The license service generates or acquires the license key along with the decryption key and an encryption key. The license service securely communicates the encryption key to an encryption service 520. Furthermore, the license service securely communicates the decryption key to the requesting application 510. The received decryption key permits the configuration header 501 of the requesting application's secure media data to be fully populated and configured for receiving encrypted media data 502.

The requesting application 510 requests the media data from a secure streaming portal via insecure communications. The secure streaming portal forwards the request to an origin streaming service, and the origin streaming service streams the desired media data directly to the encryption service 520. The encryption service 520 dynamically encrypts the received media data, buffers it, optionally caches it, and streams the encrypted media data 502 to the requesting application 510.

At this point, the requesting application 510 has a fully usable and perhaps fully populated secure media data structure. Thus, the requesting application 510 uses the decryption key to dynamically decrypt portions of the encrypted media data 502, which is being dynamically received and buffered in the secure media data structure 500 from the encryption service 520, and plays the decrypted portions of the encrypted media data 502 for a requestor or end-user associated with a requestor.

The secure media data structure 500 is uniquely processed, assembled, and consumed by a variety of entities and ultimately consumed and played by a requesting application 510. The encrypted media data 502 is custom encrypted in secure formats dictated by the license key. The license key can be dynamically generated or acquired by a license service. Only a valid license key and decryption key can be used to decrypt the encrypted media data 502. Moreover, the media data is dynamically encrypted by an encryption service 520 that interfaces to the license service and a streaming service having control and/or access to the desired media data.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A computer-implemented method for securely delivering media data, comprising:
   authenticating a requestor for secure access to media data;
   contacting a service to determine where and how the media data is to be acquired to satisfy the request and masking details of where and how the media data is acquired from the requestor;
   delivering to the requestor a first portion of configuration data for using the media data via secure communication protocols, the first portion includes a licensing key and the licensing key includes a decryption key, the licensing key, which includes the decryption key is used by the requestor to decrypt an encrypted version of the media data for play, and separately delivering to the requestor a second portion of the configuration data via insecure communication protocols, the insecure communication protocols include one or more of the following: Real Time Protocol (RTP), Real Time Streaming Protocol (RTSP), and Multimedia Messaging Service (MMS), the configuration data is logically associated with a single piece of metadata that is delivered as two pieces of metadata in separate transactions as the first portion via the secure communication protocols and the second portion via the insecure communication protocols; and
   delivering the encrypted version of the media data, via the insecure communication protocols, to the requestor and the encrypted version of the media data is unusable without the first portion of the configuration data, and wherein the decryption key is unique to requestor and the media data being requested, and the licensing key is unique to a relationship between the requestor and the media data being requested.

2. The method of claim 1 wherein authenticating further includes, altering a request from the authenticated requestor which is made for the media data to point to a secure streaming portal.

3. The method of claim 2 wherein authenticating further includes, passing the requestor to an external authentication service for authentication.

4. The method of claim 2 wherein delivering the encrypted version of the media data further includes delivering the media data in a customized encrypted format that requires the decryption key included within the configuration data before the media data is usable.

5. The method of claim 4 wherein delivering the media data further includes delivering the encrypted version of the media data by streaming the media data to an application associated with the requestor as needed.

* * * * *